(12) United States Patent
Gonzales et al.

(10) Patent No.: US 6,453,388 B1
(45) Date of Patent: Sep. 17, 2002

(54) COMPUTER SYSTEM HAVING A BUS INTERFACE UNIT FOR PREFETCHING DATA FROM SYSTEM MEMORY

(75) Inventors: Mark A. Gonzales, Portland; Linda J. Rankin, Beaverton, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/438,473

(22) Filed: May 10, 1995

Related U.S. Application Data

(63) Continuation-in-part of application No. 08/287,704, filed on Aug. 9, 1994, now abandoned, which is a continuation of application No. 07/900,142, filed on Jun. 17, 1992, now abandoned.

(51) Int. Cl.$^7$ .............................................. G06F 13/00
(52) U.S. Cl. ....................................... 711/137; 711/213
(58) Field of Search ................................. 711/137, 213

(56) References Cited

U.S. PATENT DOCUMENTS

| | | | |
|---|---|---|---|
| 4,480,307 A | 10/1984 | Budde et al. ............... 710/100 |
| 4,774,654 A | 9/1988 | Pomerene et al. .......... 711/122 |
| 4,807,110 A | 2/1989 | Pomerene et al. .......... 711/213 |
| 4,860,195 A | 8/1989 | Krauskopf .................. 711/202 |
| 5,148,525 A | 9/1992 | Ohga et al. ................. 710/107 |
| 5,261,066 A | 11/1993 | Jouppi et al. ............... 711/122 |
| 5,267,350 A | 11/1993 | Matsubara et al. ......... 712/205 |
| 5,317,718 A | 5/1994 | Jouppi ........................ 711/137 |
| 5,345,560 A | * 9/1994 | Miura et al. .................... 711/3 |
| 5,371,870 A | 12/1994 | Goodwin et al. ............ 711/213 |
| 5,499,355 A | * 3/1996 | Krishnamohan et al. .... 711/137 |
| 5,524,221 A | * 6/1996 | Sato et al. ................... 712/230 |
| 5,619,663 A | * 4/1997 | Mizrahi-Shalom et al. . 711/137 |
| 5,752,272 A | * 5/1998 | Tanabe ........................ 711/213 |
| 5,761,706 A | * 6/1998 | Kessler et al. ............... 711/118 |
| 5,903,911 A | * 5/1999 | Gaskins ....................... 711/137 |

OTHER PUBLICATIONS

Norman P. Jouppi, "Improving Direct–Mapped Cache Performance by the Addition of a Small Fully–Associative Cache and Prefetch Buffers," May 28–31, 1990, pp. 364–373, 17th Annual International Symposium on Computer Architecture, Seattle, Washington.

* cited by examiner

*Primary Examiner*—Glenn Gossage
(74) *Attorney, Agent, or Firm*—Blakely, Sokoloff, Taylor & Zafman LLP

(57) ABSTRACT

A computer system, a bus interface unit, and a method for prefetching data from system memory to a central processing unit (CPU). The system includes a dynamic random access memory (DRAM) connected to a high speed bus, a CPU and a bus interface unit that allows the CPU to communicate with the high speed bus. The bus interface unit contains logic circuitry, so that when the CPU generates a read memory access request for information associated with a first address, the interface unit generates a request packet for the information and prefetch information associated with a prefetch address. The bus interface unit creates the request packet by increasing the number of addresses originally requested by the CPU. The interface then sends the request packet to the system memory device, which retrieves and returns the requested data. The interface may include a pair of buffers which store both the information requested by the CPU and speculative or prefetch information. When the CPU generates a subsequent request, the interface compares the addresses requested with addresses in the prefetch buffer. If the buffer contains the addresses, the data is sent to the processor. The prefetch buffer is directly addressable so that any line within the buffer can be retrieved.

22 Claims, 3 Drawing Sheets

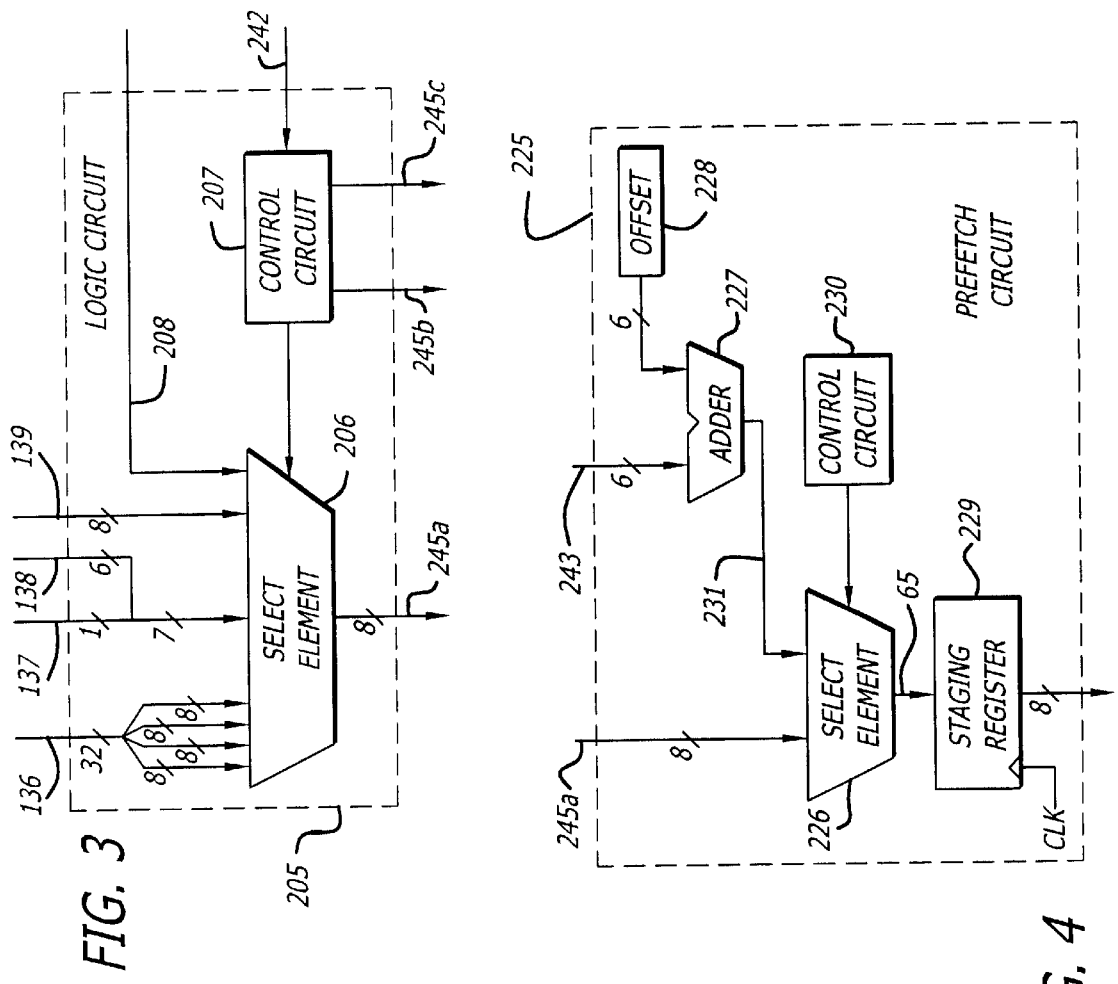
FIG. 3
FIG. 4
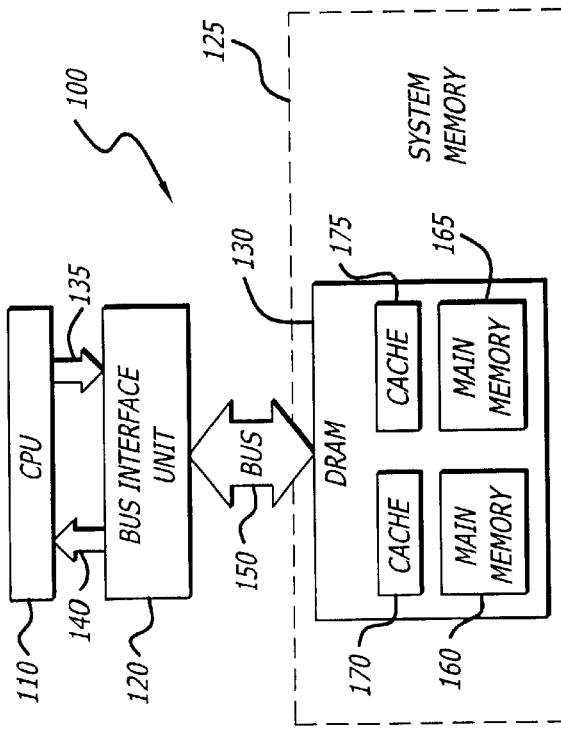
FIG. 1

COMPUTER SYSTEM HAVING A BUS INTERFACE UNIT FOR PREFETCHING DATA FROM SYSTEM MEMORY

This application is a continuation-in-part of a United States patent application entitled "Method and Apparatus for Prefetching Data from System Memory to a Central Processing Unit" (application Ser. No. 08/287,704) filed 08/09/94, now abandoned, which is a continuation of a United States patent application entitled "Method and Apparatus for Prefetching Data from System Memory" (application Ser. No. 07/900,142) filed 06/17/92, now abandoned.

BACKGROUND OF THE INVENTION

This is a continuation-in-part of a co-pending United States patent application entitled "Method and Apparatus for Prefetching Data from System Memory to a Central Processing Unit" (Ser. No. 08/287,704) filed on 08/09/94, now abandoned, which is a continuation of a United States patent application entitled "Method and Sea Apparatus for Prefetching Data from System Memory" (Ser. No. 07/900, 142) filed on 06/07/92, now abandoned,

1. Field of the Invention

The present invention relates to a method and system for reading data from a memory device through a prefetching technique.

2. Description of Related Art

It is commonly known that computer architectures include a microprocessor that reads data from and writes data to system memory which usually includes dynamic random access memory ("DRAM"). DRAM is used in system memory because it provides an inexpensive means of obtaining a large memory space. Typically, a computer system may have a number of DRAM chips, each having a plurality of addressable memory locations.

Many microprocessors read data from system memory in multiple byte blocks. Accessing multiple bytes of data from memory is usually slower than the speed of the processor, causing the processor to wait for the data. To reduce this access time, some computer architectures incorporate various levels of cache, which provide smaller yet faster blocks of addressable memory. When the processor generates a read request, the request is first sent to a cache. If the processor determines that the cache does not contain the requested data (i.e., a cache miss), the read request is sent to system memory. The data is retrieved from the system memory, and thereafter written to the processor and possibly the cache for subsequent use.

To reduce the cache "miss" rates, some computer systems include prefetch algorithms. When the processor reads data, the data associated with the successive addresses is also fetched and stored in the cache. For example, if the processor request addresses A0–A7, addresses A8–A15 will also be fetched from the system memory. The prefetch algorithm increases the "hit" rate of the subsequent read request from the processor.

Such a prefetch method is disclosed in the publication by Norman J. Jouppi, "IMPROVING DIRECT-MAPPED CACHE PERFORMANCE BY THE ADDITION OF A SMALL FULLY-ASSOCIATIVE CACHE AND PREFETCH BUFFERS", The 17th Annual International Symposium on Computer Architecture, May 28–31, 1990, pages 364–373. The system disclosed by Jouppi teaches the use of a stream buffer between the first level (L1) and second level (L2) caches of the CPU. When there is a cache miss in the L1 cache, the data is fetched from the L2 cache. When fetching from the L2 cache, the system also fetches successive addresses and stores the additional data in the stream buffer. When the CPU generates a subsequent read, the request is supplied to both the L1 cache and the stream buffer. If the stream buffer contains the addresses requested, the data is sent to the processor.

The addition of the stream buffer therefore improves the hit rate without polluting the L1 cache. If neither the stream buffer or L1 cache have the addresses, the data is fetched from the L2 cache along with a prefetch that replaces the data within the stream buffer. The stream buffer of the Jouppi system has a first in first out ("FIFO") queue, so that if the requested data is not in the top line of the buffer, the data cannot be retrieved. The requested data is then fetched from the second level cache. The stream buffer will be flushed and restarted at the missed address.

Although the Jouppi concept improves the internal performance of multilevel cache systems, it does not solve the inherent latency problems between the CPU and system memory. Prefetches have not been desirable between a CPU and system memory because the extra time needed to read the additional data slows down the processor. The increased hit rate would not compensate for the delay in memory reads, thereby resulting in an inefficient system. It would therefore be desirable to have a system that would provide an efficient way of prefetching data from system memory.

SUMMARY OF THE INVENTION

Adapted for a computer system including a central processing unit ("CPU"), system memory and a bus, a bus interface unit is coupled between the CPU and the bus to obtain requested information and prefetch information from the system memory. The bus interface unit receives a first read request for information associated with a first address of system memory. The bus interface unit produces and places a request packet requesting the information and prefetch information associated with speculative addresses onto the bus to be read by system memory. Thereafter, the system memory provides the requested information and the prefetch information to the bus interface unit along the bus. The information is transmitted to the CPU. The prefetch information may be transmitted to the CPU depending on the nature of a subsequent request by the CPU.

BRIEF DESCRIPTION OF THE DRAWINGS

The features and advantages of the present invention will become more readily apparent to those of ordinary skill in the art after reviewing the following detailed description and accompanying drawings, wherein:

FIG. 1 is a block diagram of a computer system including a bus interface unit.

FIG. 3 is a circuit diagram of the logic circuit of the bus interface unit of FIG. 2.

FIG. 4 is a circuit diagram of the prefetch circuit of the bus interface unit of FIG. 2.

DETAILED DESCRIPTION OF THE INVENTION

Figure 2:
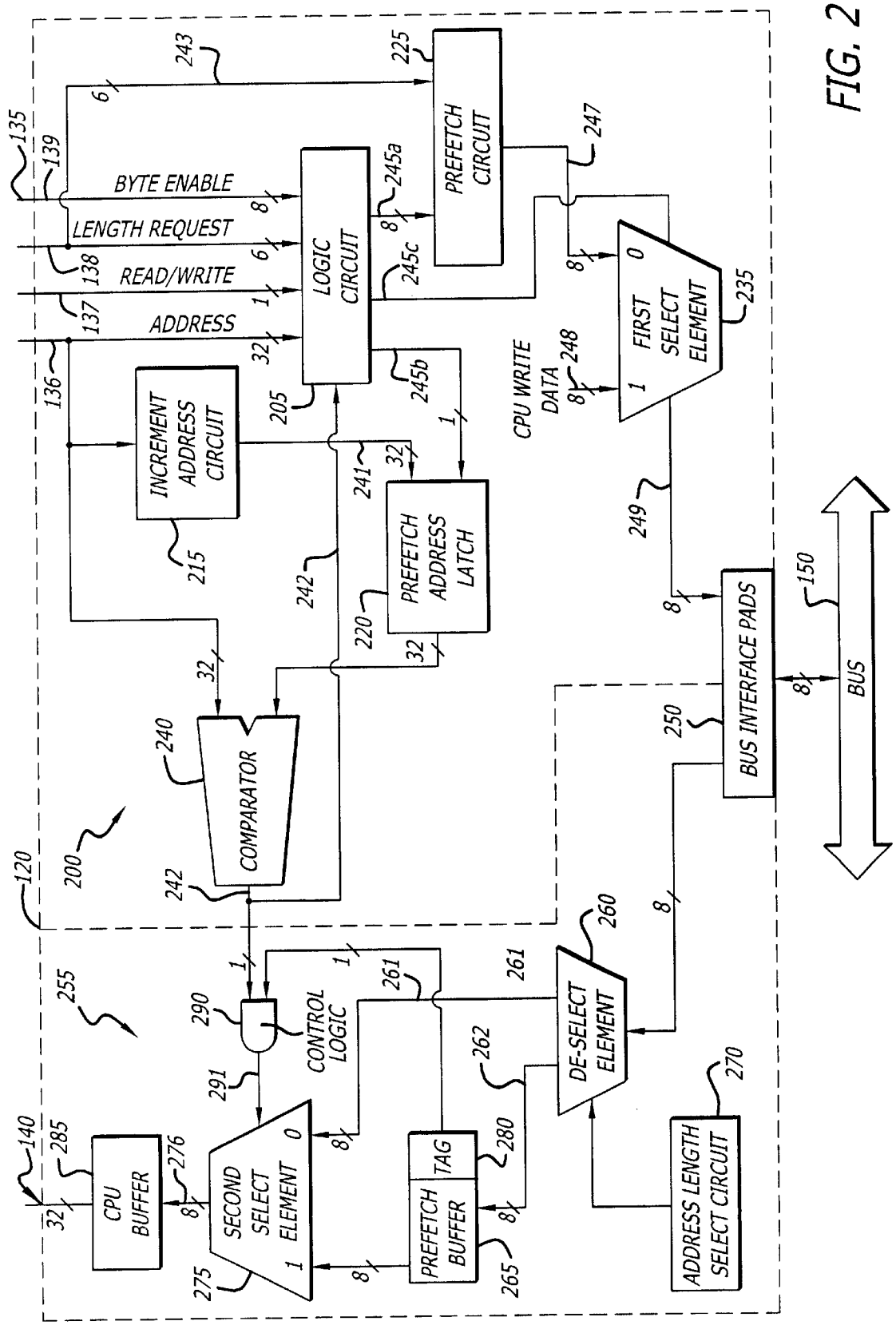
FIG. 2 is a circuit diagram of the bus interface unit of FIG. 1 including a logic circuit and a prefetch circuit.

An apparatus and method for efficiently reading data from system memory through prefetch techniques are described below. In the following description, for purposes of explanation, specific details are set forth in order to provide a thorough understanding of the present invention. However, it should be apparent to a person of ordinary skill in the art of circuit design that the present invention may be practiced without these specific details. In other instances, well known operations, functions and devices are not shown in order to avoid obscuring the present invention. Moreover, a specific example has been created for the sole purpose of illustrating the present invention, but should not be construed as a limitation on the scope of the invention.

In the detailed description, a number of terms are frequently used to describe certain logics and define certain representations herein. For example, a "select element" is defined as one or more multiplexers configured in parallel or cascaded in series to produce a desired output. A "byte" is generally defined as a plurality of information bits (i.e., binary values of address, data or control) transferred in parallel. A "request packet" is defined as a sequence of six one-byte information packets containing address, control and request length information which are transferred in series according to a format defined in "Rambus™ Product Catalog" (order no. 903010042081) published by Rambus™, Inc. of Mountain View, Calif.

Referring to the drawings more particularly by reference numbers, FIG. 1 shows a system 100 employing the present invention. The system 100 comprises a central processing unit ("CPU") 110, a bus interface unit 120 and system memory 125 including at least one Dynamic Random Access Memory ("DRAM") device 130. The CPU 110 is coupled to the bus interface unit 120 through a pair of unidirectional buses 135 and 140. The bus interface unit 120 is coupled to the system memory 125 through a bi-directional bus 150 thereby enabling the CPU 110 to communicate with the system memory 125 through the bus interface unit 120. The bus 150 is configured to support the Rambus™ protocol.

The CPU 110 is capable of generating read and write memory access requests to the system memory 125. The information transferred includes data and/or instructions, both of which will be generically referred to as "information" unless otherwise distinguished. In general, the CPU 110 generates a read memory access request in sixteen (16) byte bursts corresponding to a byte length of a cache line. However, it is contemplated that bursts can be appropriately altered to correspond with cache lines of 32 or 64 bytes in length. The read memory access requests includes addresses that are to be read from system memory 125.

System memory 125 preferably comprises at least one DRAM device manufactured, for example, by Rambus™, Inc. of Mountain View, Calif. Each DRAM preferably includes two blocks of main memory 160 and 165, each block including a 36×256×256 array of memory cells wherein four (4) bits of the 36 bit-wide block are used for parity. Each block 160 and 165 operates in conjunction with its dedicated cache 170 and 175 having a cache line of sixteen (16) bytes and storing approximately one kilobyte ("Kbyte") of information. Preferably, the bus 150 is one byte wide such that information is serially transferred one byte at a time. The data transfer rate on the bus 150 is preferably on the order of 500 Megabytes/second (M/bytes/sec) which translates into a clock "CLK" rate of 2 nanoseconds.

Referring now to FIG. 2, an illustrative embodiment of the bus interface unit 120 is shown. The bus interface unit 120 comprises a transmitting sub-unit 200 that converts a read or write memory access request from the CPU into a request packet compressed of a sequence of one-byte information packets formatted according to the Rambus™ protocol. The bus interface unit 120 further includes a receiving sub-unit 255 that reconverts bytes of information from the system memory 125 into a format configured for the CPU. The transmitting sub-unit 200 includes a logic circuit 205, an increment, address circuit 215, a prefetch address latch 220, a prefetch circuit 225, a first select element 235 and a comparator 240.

The CPU is coupled to the logic circuit 205 through the uni-directional bus 135 which includes address lines 136, a read/write line 137, length request lines 138 and byte enable lines 139. The address lines 136 are illustrated to be 32-bits wide to support a four gigabyte address space while the read/write line 137, length request lines 138 and byte enable lines 139 are represented as having bit widths of one, six and eight bits, respectively. It is contemplated that such bit widths are chosen for illustrative purposes and may be varied accordingly.

The address lines 136 are used for transferring an address of information requested by the CPU ("request information") to be read from or written to system memory. For clarity sake, this address is referred to as the "first address". The address lines 136 are further coupled to both the increment address circuit 215 and the comparator 240. The address lines 136 are coupled to the increment address circuit 215 in order to produce a speculative address by incrementing the first address on the address lines 136. Thereafter, the speculative address is transferred via address lines 241 to the prefetch address latch 220 and temporarily stored therein upon assertion of an enable signal via enable line 245b. The speculative address is used in determining whether information associated with a subsequent CPU request has already been "prefetched" and stored in the prefetch address latch 220 as discussed below.

In addition, the read/write line 137 is used to signal whether the CPU desires to read information from or write information into system memory. The length request lines 138 are used to indicate the amount of information requested by the CPU (preferably at least one byte), while the byte enable lines 139 are used to indicate the number of bytes to be written to a selected address location in system memory.

Referring now to FIG. 3, the logic circuit 205 operates as a parallel-to-byte serial converter which receives information bits of the read or write memory access request from the CPU via lines 136–139 and serially transfers the sequence of one-byte information packets into the prefetch circuit 225 through lines 245a(see FIGS. 2 and 4). Collectively, these information packets include, but are not limited to, the address requested by the CPU, a number of bytes requested (length or byte enable) and control information indicating the type of transaction (read or write).

The serial transmission of the information packets is controlled by appropriately routing the information bits into a select element 206 and selectively outputting a byte at a time under direction of a well-known control circuit 207 operating in accordance with the Rambus™ protocol. The control circuit 207 generally allows the serial single-byte transmission of the information packets except, if the control circuit detects, during a read memory access request, that the first address is identical to the speculative address. Such detection is accomplished by monitoring whether an output line 242 from the comparator is asserted (logic "1") or not. If the output line is asserted the select element 206 is disabled from transmitting the information packets to the prefetch circuit 225 but rather uses information previously stored in a prefetch buffer 265 of the receiving sub-unit 255 (see FIG. 2). If the output line 242 is not asserted, indicating no match, the logic circuit asserts the enable line 245b to allow the speculative address to be stored in the prefetch address latch 220 (see FIG. 2).

In the event that the first address is not equal to the speculative address, the prefetch circuit 225 receives information packets. As shown in FIG. 4, the prefetch circuit 225 comprises a select element 226, an adder 227, an offset storage element 228, a staging register 229 and control circuit 230. The select element 226 receives the sequence of information packets from the logic circuit 205 and one information packet from the adder 227 through signal lines 231. This information packet from the adder 227 is the sum of the (i) length request information provided by lines 243, which are coupled to the length request lines 138, and (ii) an offset from the offset storage element 228. The offset is a binary representation equal to the number of bytes of "prefetch information" requested in addition to the request information. The prefetch information is typically equal to a cache line in size (sixteen bytes for this illustrative embodiment). Thus, the system memory provides more information than requested by the CPU.

During a cache line read request, the prefetch circuit 225 monitors the sequence of information packets for the length request information and upon detecting the length request information, the control circuit 230 selects the output of the adder 227 to increase the number of bytes of information retrieved from system memory before the addresses are sent to system memory. The information packets propagate in series through the select element 226 and into the staging register 229 clocked at CLK. The staging register 229 is merely used for timing purposes for transmission to the first select element 235 (see FIG. 2) via lines 247.

For example, if the CPU issues a read request for a cache line of sixteen bytes addressed by A0–A15, the prefetch circuit 225 will alter the length request to reflect two cache lines addressable by A0–A31. The bus interface unit 120 would then send the read request to system memory requesting information associated with the addresses A0–A31 which would be subsequently transferred from system memory to the bus interface unit 120. The prefetch circuit 225 may also contain logic to ensure that the speculative addresses do not extend into a different DRAM. Depending upon the characteristics of the CPU, the prefetch circuit 225 may generate an additional request instead of changing the addresses requested.

Referring back to FIG. 2, the first select element 235 receives as a first input information packets from the prefetch circuit 225 and data directly from the CPU via data lines 248 as a second input. The first select element 235 is controlled by the logic circuit 205 via select line 245c. For a read memory access request, the logic circuit 205 only selects the information packets from the prefetch circuit 225 to be propagated from the first input of the first select element 235, along output lines 249 and onto bus interface pads 250 for later transmission through the bus 150. However, for a write memory access request, the logic circuit 205 first selects the first select element 235 to propagate the information packets to the bus interface pads 250 and, after completing the write memory access request, the logic circuit 205 selects the first select element 235 to propagate write data from data lines 248 to the bus interface pads 250.

Referring back to FIG. 1, when the CPU generates a read memory access request, the bus interface unit 120 takes the addresses requested and generates and transmits the request packet onto the bus 150. Each DRAM of the system memory 125 monitors the bus 150. The addresses are compared with the addresses stored in one of the caches 170 and 175. If the cache contains the requested information addressed at the first address, the DRAM 130 provides an asserted acknowledge signal to the bus interface unit 120 and transmits the information onto the bus 150, byte by byte. If the requested information is not within cache, the DRAM 130 transmits a negative acknowledge signal to the bus interface unit 120 and performs an internal cache fetch. The internal cache fetch transfers the requested information from main memory 160 or 165 into its cache 170 or 175, respectively. The bus interface unit 120 then resubmits a read memory access request into the bus 150. The DRAM 130 now has the requested information in cache, which is then transmitted to the bus interface unit 120. Because most CPU's cannot retrieve information byte by byte every 2 nanoseconds, the bus interface unit 120 has a CPU buffer 285 (FIG. 2) that stores the data from the bus for subsequent retrieval by the CPU. The CPU buffer 285 converts bytes from a second select element 275 into 32-bit parallel data for the CPU.

Referring again to FIG. 2, the receiving sub-unit 255 of the bus interface unit 120 comprises a de-select element 260, a prefetch buffer 265, an address length select circuit 270, the second select element 275, a tag element 280, the CPU buffer 285 and control logic 290. The de-select element 260 is controlled by the address length select circuit 270 to transfer the information from the bus 150 to either the prefetch buffer 265 or the second select element 275. The address length select circuit 270 stores the number of bytes requested by the CPU through the length request line 138 and counts each byte of information received from system memory through the bus 150. Thus, continuing the above-described example, the request information (information from A0–A15) would be routed to the second select element 275 via signal lines 261 while the prefetch information (information from A16–A31) would be alternatively routed for storage in the prefetch buffer 265 via signal lines 262.

In order to increase the operational speed of the system, the bus interface unit 120 is configured to include the comparator 240 which checks whether the CPU 110 is issuing a read memory access request for information that has been already been prefetched by a prior read memory access request. This is done by comparing the address of the current read memory access request to the speculative address stored in the prefetch address latch 220 and provided to the comparator 240. If the tag element 280 is set, indicating that the prefetch buffer 265 is storing valid prefetch information, the control logic 290 controls the second select element 275 so that the prefetch information is transferred from the prefetch buffer 265 to the CPU buffer 285 through signal lines 266 and 276. Moreover, the logic circuit 205 is disabled through signal line 242 since no information needs to be retrieved from system memory. However, if the addresses are not equal, the process continues as described above.

More specifically, using the specific example described above for illustrative purposes, for a read memory access request, the request information associated with A0–A15 is input into the second select element 275 via lines 261. Since the tag element 280 is initially cleared, the output from the control logic 290 selects the second select element 275 to transmit the request information to the CPU buffer 285 for conversion to parallel data. Thereafter, the prefetch information associated with A16–A31 is stored in the prefetch buffer 265 causing the tag element 280 to be set.

Upon the CPU issuing another request, for example a read memory access request, the comparator circuit 240 compares the address produced by the read memory access request with the speculative address stored in the prefetch address latch 220. If these addresses are identical, the comparator 240 asserts the signal line 242 which disables the logic circuit 205 to prevent it from transferring information to the prefetch circuit 225 and propagates a logic "1" to a first input of the control logic 290. Since the tag element 280 is set from the prior read memory access request, the control logic 290 asserts its select lines 291 to allow the prefetch information from the prefetch buffer 265 to be transmitted to the CPU buffer 285. If there is a write request to an address which has previously been prefetched and is stored in the prefetch buffer 265, the tag element 280 is cleared and the information is overwritten or cleared.

Figure 5:
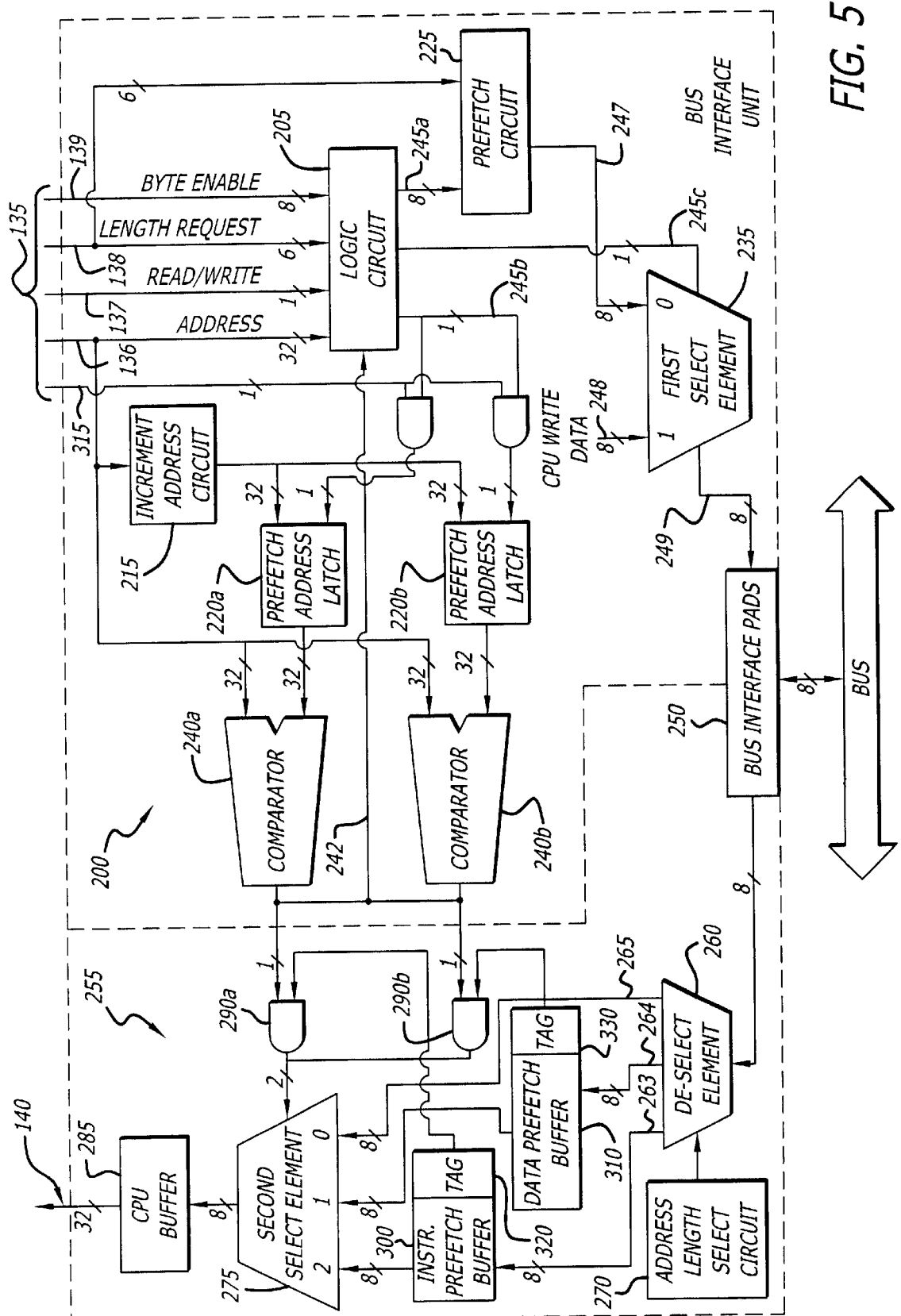
FIG. 5 is a schematic of an alternate embodiment of the bus interface unit.

Referring now to FIG. 5, a second illustrative embodiment of the bus interface unit 120 may include a plurality of prefetch buffers 300 and 310 in which one of these prefetch buffers (i.e., the instruction prefetch buffer 300) is configured to store instructions while the other prefetch buffer (i.e., the data prefetch buffer 310) is used to store data. It is contemplated, however, that multiple data or instruction prefetch buffers may be employed simultaneously by altering the bus interface unit 120 in a manner similar to that described below.

The isolation of the instruction prefetch buffer 300 from the data prefetch buffer 310 allows one type of information to be retrieved by the CPU without purging the prefetch buffer for the other type. This increases the "hit" rate within the prefetch buffers 300 and 310. Computer programs will typically run with consecutive lines of instruction or data. The successive lines can be interrupted with a request for data instruction. Such an interruption can degrade the performance of the speculative prefetch. For example, in a system with one prefetch buffer (as shown in FIG. 2), the CPU may first request an instruction, wherein a prefetched instruction is stored in the prefetch buffer. The CPU may then request data, which is not in the prefetch buffer and must be retrieved from memory. The bus interface unit 120 would prefetch the data and overwrite the prefetched instructions with the data. If the CPU subsequently requests instructions, the CPU request must be retrieved from memory because the prefetch buffer now contains data. With the dual buffer system as shown in FIG. 5, the original speculative instructions will still exist in prefetch buffer 300, when the CPU generates the subsequent instruction request.

In order to configure the bus interface unit 120 to support the plurality of buffers 300 and 310, additional logic circuitry must be duplicated to operate in parallel. As shown, for two prefetch buffers 300 and 310, the transmitting sub-unit 200 is altered to include two prefetch address latches 220a and 220b and two comparators 240a and 240b operating in parallel. The prefetch address latches 220a and 220b are enabled by logically ANDing an enable signal from the logic circuit 205, asserted as discussed in reference to FIG. 2, and a CPU INSTRUCTION/DATA control signal from the CPU via control line 315 to indicate whether the CPU request is for instructions or data.

In addition, the receiving sub-unit 255 is altered by including the two prefetch buffers 300 and 310 with corresponding tag elements 320 and 330, respectively., Moreover, the de-select element 260 includes output lines 263–265 which are inputs for the prefetch instruction buffer 300, the prefetch data buffer 310 and the second select element 275, respectively. Moreover, the de-select element 260 is required initially to transmit request information into the second select element 275 and transmit the prefetch instruction or prefetch data to the instruction prefetch buffer or data prefetch buffer 310, respectively.

While certain exemplary embodiments have been described in detail and shown in the accompanying drawings, it is to be understood that such embodiments are merely illustrative of and not restrictive on the present invention and that the invention is not limited to the specific arrangements and constructions shown and described, since various other modifications may occur to those ordinarily skilled in the art.

What is claimed is:

1. A computer system comprising:

a bus;

a memory device coupled to said bus;

a central processing unit generating a first memory access request for first information, the first information associated with a first address of said memory device; and a bus interface unit, coupled between said central processing unit and said bus, including a transmitting sub-unit and a receiving sub-unit;

said transmitting sub-unit receives said first memory access request to generate a request packet for said first information and second information, the second information being prefetch information associated with a speculative address and places said request packet onto said bus, the speculative address being produced by incrementing the first address using an increment address circuit;

said receiving sub-unit comprising:

an output buffer for temporarily storing at least said first information before outputting said first information to said central processing unit;

at least one input buffer for storing said second information;

a select element, coupled to said output buffer and said at least one input buffer, for outputting one of said first information and said second information into said output buffer;

a control logic circuit, coupled to said select element, for controlling said select element to output one of said first and second information into said output buffer;

a de-select element, coupled to said select element and said at least one input buffer, for receiving in series said first information and said second information from said memory device and outputting said first information to said select element and said second information to said at least one input buffer, and an address length select circuit, coupled to said de-select element, for controlling said de-select element to output said first information into said select element and to output said second information into said at least one input buffer;

said receiving sub-unit receives said first information and said second information and transfers at least said first information to said central processing unit.

2. The computer system according to claim 1, wherein said control logic circuit controls said select element to output said second information to said output buffer if a second memory access request requests information associated with said speculative address to said output buffer.

3. The computer system according to claim 1, wherein said transmitting sub-unit includes;

a logic circuit for receiving said first memory access request from the central processing unit and for formatting said first memory access request into said request packet;

a prefetch circuit, coupled to the logic circuit, for altering at least one information packet of said request packet so that said request packet requests said first information and said second information; and the increment address circuit for receiving said first address and producing said speculative address.

4. The computer system according to claim 3, wherein said first memory access request includes at least said first address, a read/write parameter and a length request parameter.

5. The computer system according to claim 4, wherein said prefetch circuit includes a storage element for storing a predetermined offset and an adder circuit for adding the predetermined offset to the length request parameter to produce a modified length request parameter.

6. The computer system according to claim 5, wherein said request packet includes said first address, said read/write parameter and said modified length request parameter.

7. A computer system comprising:

memory means for storing first information;

processor means for generating a first memory access request for first information, said first information associated with a first address of said memory means;

bus means for transferring at least said first information from said memory means to said processor means; and bus interface means, coupled between said processor means and said bus means, for retrieving said first information and second information, the second information being prefetch information associated with a speculative address from said memory means, the speculative address being produced by incrementing the first address using an increment address circuit, said bus interface means comprising:

transmitting means for receiving said first memory access request for said first information, for generating a request packet for said first information and said second information and for placing said request packet onto said bus means; and receiving means for receiving said first information and said second information and for transferring at least said first information to said processor means;

said receiving means comprising:

output buffer means for temporarily storing at least said first information before outputting said first information to said processor means;

input buffer means for storing said second information;

select means, coupled to said output buffer means and said input buffer means, for outputting one of said first information and said second information into said output buffer means;

control logic means, coupled to said select means, for controlling said select means to output one of said first information and said second information to said output buffer means;

de-select means, coupled to said select means and said input buffer means, for receiving in series said first information and said second information from said memory means and outputting said first information to said select means and said second information to said input buffer means; and address length select means, coupled to said de-select means, for controlling said de-select means to output said first information into said select means and to output said second information into said input buffer means.

8. The computer system according to claim 7, wherein said transmitting means includes;

logic circuit means for receiving said first memory access request from the processor means and for formatting said first memory access request into the request packet;

prefetch circuit means, coupled to the logic circuit means, for altering at least one information packet of said request packet so that said request packet requests said first information and said second information; and the increment addressing circuit for receiving said first address and producing said speculative address.

9. The computer system according to claim 8, wherein said first memory access request includes at least said first address, a read/write parameter and a length request parameter.

10. The computer system according to claim 9, wherein said prefetch circuit means includes a storage element for storing a predetermined offset and an adder circuit for adding the predetermined offset to the length request parameter to produce a modified length request parameter.

11. The computer system according to claim 10, wherein said request packet includes said first address, said read/write parameter and said modified length request parameter.

12. A bus interface unit, coupled between a central processing unit and a bus, comprising:

a transmitting sub-unit for receiving a first memory access request for first information associated with a first address, generating a request packet for said first information and second information, the second information being prefetch information associated with a speculative address and placing said request packet onto said bus, the speculative address being produced by incrementing the first address using an increment address circuit; and a receiving sub-unit for receiving said first information and said second information and transferring at least said first information to said central processing unit;

said receiving sub-unit comprising:

an output buffer for temporarily storing at least said first information before outputting said first information to said central processing unit;

at least one input buffer for storing said second information;

a select element, coupled to said output buffer and said at least one input buffer, for outputting one of said first information and said second information into said output buffer;

a control logic circuit, coupled to said select element, for controlling said select element to output one of said first information and said second information to said output buffer;

a de-select element for receiving in series said first information and said second information transmitted along said bus and outputting said first information to said select element and said second information to said at least one input buffer; and an address select circuit, coupled to said de-select element, for controlling said de-select element to output said information into said select element and to output said prefetch information into said at least one input buffer.

13. The bus interface circuit according to claim 12, wherein said control logic circuit controls said select element to output said prefetch information if a second memory access request, immediately subsequent to said first memory access request, requests information associated with said speculative address.

14. The bus interface unit according to claim 12, wherein said transmitting sub-unit includes;
   a logic circuit for receiving said first memory access request from the central processing unit and for formatting said first memory access request into said request packet;
   a prefetch circuit, coupled to the logic circuit, for altering at least one information packet of said request packet so that said request packet requests said first information and said second information; and
   the increment address circuit for receiving said first address and producing said speculative address.

15. The bus interface unit according to claim 14, wherein said first memory access request includes at least said first address, a read/write parameter and a length request parameter.

16. The bus interface unit according to claim 15, wherein said prefetch circuit includes a storage element for storing a predetermined offset and an adder circuit for adding the predetermined offset to the length request parameter to produce a modified length request parameter.

17. The bus interface unit according to claim 16, wherein said request packet includes said first address, said read/write parameter and said modified length request parameter.

18. A bus interface circuit, coupled between a processor and a bus, for retrieving first information and second information from a memory device, said bus interface circuit comprising:
   transmitting means for receiving a first memory access request for generating a request packet for said first and second information, said first information associating with a first address and said second information being prefetch information associated with a speculative address and for placing said request packet onto said bus, the speculative address being produced by incrementing the first address using an increment address circuit; and
   receiving means for receiving said first information and said second information and for transferring at least said first information to said processor;
   said receiving means comprising:
      output buffer means for temporarily storing at least said first information before outputting said first information to said processor,
      input buffer means for storing said second information;
      select means, coupled to said output buffer means and said input buffer means, for outputting one of said first information and said second information into said output buffer means;
      control logic means, coupled to said select means, for controlling said select means;
      de-select means, coupled to said select means and said input buffer means, for receiving in series said first information and said second information and for outputting said first information to said select means and said second information to said input buffer means; and
      address length select means, coupled to said de-select means, for controlling said de-select means.

19. The bus interface unit according to claim 18, wherein said transmitting means includes;
   logic circuit means for receiving said first memory access request from the processor and for formatting said first memory access request into said request packet; and
   prefetch circuit means, coupled to the logic circuit means, for reconfiguring at least one information packet of the request packet so that said information packet requests said first information and said second information.

20. The bus interface unit according to claim 19, wherein said first memory access request includes at least said first address, a read/write parameter and a length request parameter.

21. The bus interface unit according to claim 19, wherein said prefetch circuit means includes a storage element for storing a predetermined offset and an adder circuit means for adding the predetermined offset to the length request parameter to produce a modified length request parameter.

22. The bus interface unit according to claim 21, wherein said request packet includes said first address, said read/write parameter and said modified length request parameter.

* * * * *

UNITED STATES PATENT AND TRADEMARK OFFICE
CERTIFICATE OF CORRECTION

PATENT NO. : 6,453,388 B1
DATED : September 17, 2002
INVENTOR(S) : Gonzales et al.

It is certified that error appears in the above-identified patent and that said Letters Patent is hereby corrected as shown below:

Column 4,
Line 1, delete "compressed", insert -- comprised --.
Line 7, after "increment, delete ",".
Line 65, after "asserted", insert -- , --.

Signed and Sealed this

Twenty-first Day of September, 2004

JON W. DUDAS
*Director of the United States Patent and Trademark Office*